Figure 1:
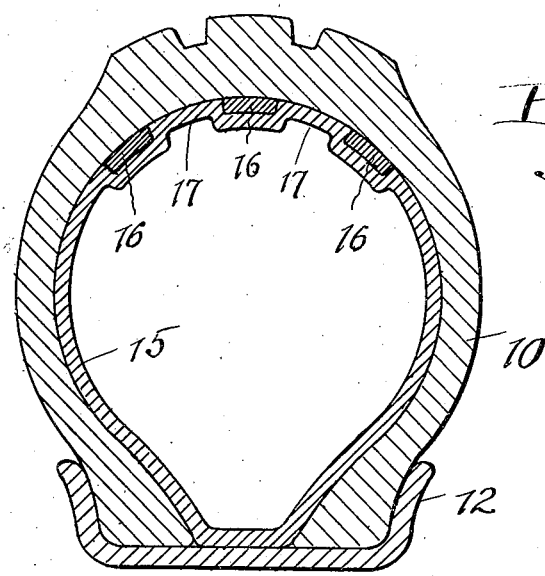

April 8, 1924.

P. E. WELTON 1,489,569

INNER TUBE FOR PNEUMATIC TIRES

Filed Nov. 9, 1921

Inventor
Park E. Welton
by
Thurston Kwis & Hudson
attys.

Patented Apr. 8, 1924.

1,489,569

UNITED STATES PATENT OFFICE.

PARK E. WELTON, OF CUYAHOGA FALLS, OHIO, ASSIGNOR TO THE AKRON ENGINEERING COMPANY, OF AKRON, OHIO, A CORPORATION OF OHIO.

INNER TUBE FOR PNEUMATIC TIRES.

Application filed November 9, 1921. Serial No. 514,026.

*To all whom it may concern:*

Be it known that I, PARK E. WELTON, a citizen of the United States, residing at Cuyahoga Falls, in the county of Summit and State of Ohio, have invented a certain new and useful Improvement in Inner Tubes for Pneumatic Tires, of which the following is a full, clear, and exact description.

The object of this invention is to provide an inner tube which when combined with a suitable outer casing will produce a pneumatic tire which in certain parts is practically nonpuncturable and in other parts is substantially self-healing if punctured.

The invention consists in an inner tube having the charactertistics shown in the drawing and hereinafter described, and the combination of such a tube with an outer casing, as definitely pointed out in the appended claims.

Figure 2:
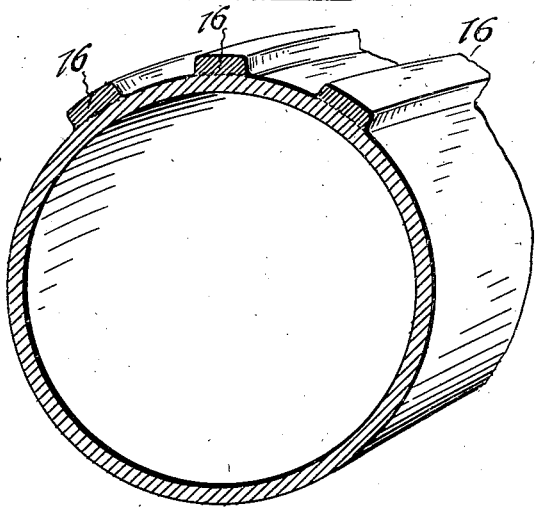

In the drawing, Fig. 1 is a radial section of a pneumatic tire casing, the rim on which it is mounted, and an inflated inner tube constructed according to the present invention; Fig. 2 is a perspective view of said inner tube.

Referring to the parts by reference characters, 10 represents an outer casing in a commonly used form; 12 represents the rim on which said tire casing is mounted; and 15 represents the inner tube.

This tube is like inner tubes which are in common use except for the fact that on the tread portion of the tube there are a plurality of circumferentially extended spaced apart ribs 16. The material employed in making up the tube may be substantially like that which is generally employed for inner tubes; but preferably, although not necessarily, the material from which the ribs 16 are made is harder, so that when vulcanized it is better adapted to resist puncture. When the ribs are made of this harder material they are applied to the surface of the tube while both the ribs and the tube are unvulcanized. If the ribs and the body of the tube are of the same material the ribs may be applied in like manner, or they may be molded upon the tube by any suitable means or method.

In order to get the best service from the described tube it should be used in an outer casing containing an annular chamber whose dimensions in radial section are substantially equal to that of dimensions which the tube would have if it had no ribs applied to it, and if the tube were inflated but not stretched. When a tube is put into a tire casing of the dimensions substantially as specified, and the tube is filled with air under the working pressure, the ribbed part of the tube will be pressed inward as the unribbed intermediate portions 17 are forced into contact with the inner surface of the outer casing. The result will be that these portions 17 instead of being stretched will be slightly compressed. If, therefore, a nail or something of the sort punctures the tire casing and any portion of the part 17 of the tube, the rubber by reason of its compressed condition, will tightly grip the nail and substantially prevent leakage around it. If the nail is subsequently withdrawn the hole which it made will close up by reason of the fact that the rubber is under compression. The ribbed portion of the tube is rendered resistant to puncturing by reason of the fact that this ribbed part is twice as thick as the tube itself, and, by reason of the further fact that the applied ribs may be of tougher or more puncture resisting material.

Having described my invention, I claim:—

1. An inner tube for pneumatic tires comprising a tubular annulus having applied to its tread surface a plurality of circumferential ribs, all said ribs being spaced apart laterally throughout the circumference of the tube and forming one or more continuous circumferential channels between them.

2. A pneumatic tire comprising, in combination, an outer casing, and an inner tube, which latter is provided on its tread surface with a plurality of spaced apart external circumferentially extended ribs, the cross sectional area of the space within the tire casing being substantially equal to the cross sectional area which the tube will have if expanded, but not stretched, and if the ribs were omitted.

3. A pneumatic tire comprising, in combination, an outer casing, and a inner tube therein, said inner tube having on its tread surface a plurality of external spaced-apart circumferentially-extended ribs forming between them circumferentially extending channels which when the tube is expanded within the casing will be forced inward thereby compressing the parts of the tube in the channels between the ribs.

In testimony whereof, I hereunto affix my signature.

PARK E. WELTON.